United States Patent
Guerrero et al.

(10) Patent No.: US 6,640,658 B1
(45) Date of Patent: Nov. 4, 2003

(54) WET-TAP SENSOR ASSEMBLY AND RELATED METHOD

(75) Inventors: Sergio Guerrero, Valinda, CA (US); Gert Burkhardt, Pasadena, CA (US)

(73) Assignee: Signet Scientific Company, El Monte, CA (US)

( * ) Notice: Subject to any disclaimer, the term of this patent is extended or adjusted under 35 U.S.C. 154(b) by 0 days.

(21) Appl. No.: 10/170,243

(22) Filed: Jun. 11, 2002

(51) Int. Cl.⁷ .............................................. G01D 21/00
(52) U.S. Cl. ..................................................... 73/866.5
(58) Field of Search ...................... 73/866.5, 863.85; 204/401, 416, 421, 422, 433

(56) References Cited

U.S. PATENT DOCUMENTS

| | | | | |
|---|---|---|---|---|
| 3,691,846 A | * | 9/1972 | Ingold ....................... | 73/432 R |
| 4,375,170 A | * | 3/1983 | Sperry, III et al. ....... | 73/863.85 |
| 4,578,170 A | * | 3/1986 | Sheridan ..................... | 204/400 |
| 4,595,487 A | | 6/1986 | Nunlist ........................ | 204/433 |
| 5,011,587 A | | 4/1991 | Schmidt ....................... | 204/401 |
| 5,138,755 A | * | 8/1992 | Evans et al. .................... | 29/263 |
| 5,139,641 A | * | 8/1992 | Neukum ....................... | 204/435 |
| 5,385,060 A | * | 1/1995 | Wang ........................ | 73/866.5 |
| 5,939,610 A | * | 8/1999 | Iwamoto et al. .............. | 73/1.03 |
| 5,971,001 A | | 10/1999 | Andersson ................... | 137/15 |
| 5,996,430 A | | 12/1999 | Bellis, Sr. .................. | 73/866.5 |
| 6,055,864 A | | 5/2000 | Stiller .......................... | 73/724 |
| 6,131,473 A | | 10/2000 | Hoffman ..................... | 73/866.5 |

FOREIGN PATENT DOCUMENTS

DE    197 23 681 A1    12/1998

* cited by examiner

*Primary Examiner*—Hezron Williams
*Assistant Examiner*—C D Garber
(74) *Attorney, Agent, or Firm*—Sheppard, Mullin, Richter & Hampton LLP

(57) ABSTRACT

This invention resides in a wet-tap sensor assembly and related method for use with containers, such as, pressurized pipes of flowing liquids to measure the contents therein. In use, the housing is securely attached to over a hole in an external wall of the container, and a sensor cartridge of the assembly movably inserts and retracts a sensor probe relative to the contents. With the sensor probe in place, whether inserted or retracted, the assembly has means to prevent the contents from escaping. The sensor assembly includes a locking mechanism that locks the sensor cartridge in the retracted position allowing for removal of the sensor probe while preventing against inadvertent displacement of the sensor cartridge, and preferably includes a cap positioned over the sensor cartridge that prohibited removal of the sensor probe without first retracting the sensor cartridge and that disengages the locking mechanism.

10 Claims, 8 Drawing Sheets

WET-TAP SENSOR ASSEMBLY AND RELATED METHOD

FIELD OF THE INVENTION

The present invention relates generally to sensor assemblies for use in measuring various parameters of fluids located within containers and, more particularly, to wet-tap sensor assemblies having a movable sensor cartridge for inserting and retracting a sensor relative to the container.

BACKGROUND OF THE INVENTION

In many industrial applications, sensors are used to provide a wide variety of useful information regarding fluids located within a container. When containers, such as pressurized pipes containing gases or liquids, are at or near full capacity, it is beneficial to have the ability to insert and retract a sensor without allowing the fluid to escape, i.e., wet-tap. The use of a wet-tap sensor assembly mounted externally to a container is recognized as an effective way to measure parameters of the contained fluid without allowing the fluid to escape. For example, with reference to pipes of flowing liquids, such sensor assemblies typically include a housing that mounts over a hole in the pipe and a sensor cartridge that is movably attached to the housing and that defines a bore for receiving a sensor probe. The cartridge movably inserts and retracts the sensor probe relative to the flowing liquid without any interruption to the flow of liquid in the pipe. Such sensor assemblies further include sealing means, e.g., gaskets, for forming a seal between the housing and the cartridge whether the cartridge is inserted or retracted.

When a need arises for the sensor probe to be serviced, repaired, or replaced, the movable cartridge and sensor probe are retracted, forming a seal between the cartridge and the housing and, thereafter, the sensor probe can be removed relatively safely. However, if the cartridge is inadvertently displaced from its retracted position to its inserted position without the sensor probe in place, or if the sensor probe is removed prior to retracting the cartridge, the fluid can escape through the bore of the cartridge. Such fluids can be extremely toxic and grave harm may result if it comes into contact with maintenance personnel. To avoid this risk, the flow of the fluid in the pipe often is reduced or stopped while the sensor is removed, which increases associated costs.

It should, therefore, be appreciated that there is a need for a wet-tap sensor assembly for use in measuring parameters of a fluid located in a container that reduces the risk of escape of the fluid, thereby providing increased safety and related benefits. The present invention fulfills this need as well as others.

SUMMARY OF THE INVENTION

The present invention provides a wet-tap sensor assembly for use with containers, such as, pressurized pipes of gases or liquids. The sensor assembly includes a movable sensor cartridge mounted to a housing. The sensor cartridge is configured to be movable between an inserted position and a retracted position. In use, the housing is securely attached relative to an external wall of the container, and the sensor cartridge movably inserts and retracts a sensor probe relative to the contents of the container. With the sensor probe in place, whether inserted or retracted, the assembly has means to prevent the contents from escaping. The sensor assembly includes a locking mechanism that locks the sensor cartridge in the retracted position allowing for removal of the sensor probe while preventing against inadvertent displacement of the sensor cartridge.

The invention also resides in a method operating a wet-tap sensor assembly. The method includes inserting a sensor probe into a sensor cartridge movably mounted to a housing securely attached relative to an external wall of a container, wherein the sensor cartridge is locked in a retracted position. The method further includes unlocking the sensor cartridge and transferring the sensor cartridge from the retracted position to an inserted position thereby exposing the sensing end beyond a lower opening of the housing.

In a detailed aspect of preferred embodiments of the invention, the sensor assembly further includes a cap positioned over an upper portion of the sensor cartridge, e.g., cartridge head, and the cap is configured to prohibit removal of the sensor probe without first retracting the sensor cartridge. The cap can be used to disengage the locking mechanism by rotating the cap a prescribed amount. Preferably, the cap includes a cam surface in an inner cavity of the cap configured to perform the disengagement function. Preferably, the configurations of the cap, the sensor cartridge, and the housing cooperate to require prescribed orientations of cap when performing various functions, e.g., unlocking the sensor cartridge, securing the cap when in the inserted position, and removing the sensor probe.

In another detailed aspect of preferred embodiments of the invention, the locking mechanism includes an engaging device movably mounted to the housing adjacent to the sensor cartridge, and the sensor cartridge defines an engagement region configured to receive the engaging device when in the retracted position, thereby locking the sensor cartridge in place.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

Embodiments of the present invention will now be described, by way of example only, with reference to the following drawings in which.

DESCRIPTION OF THE PREFERRED EMBODIMENTS

Figure 1:
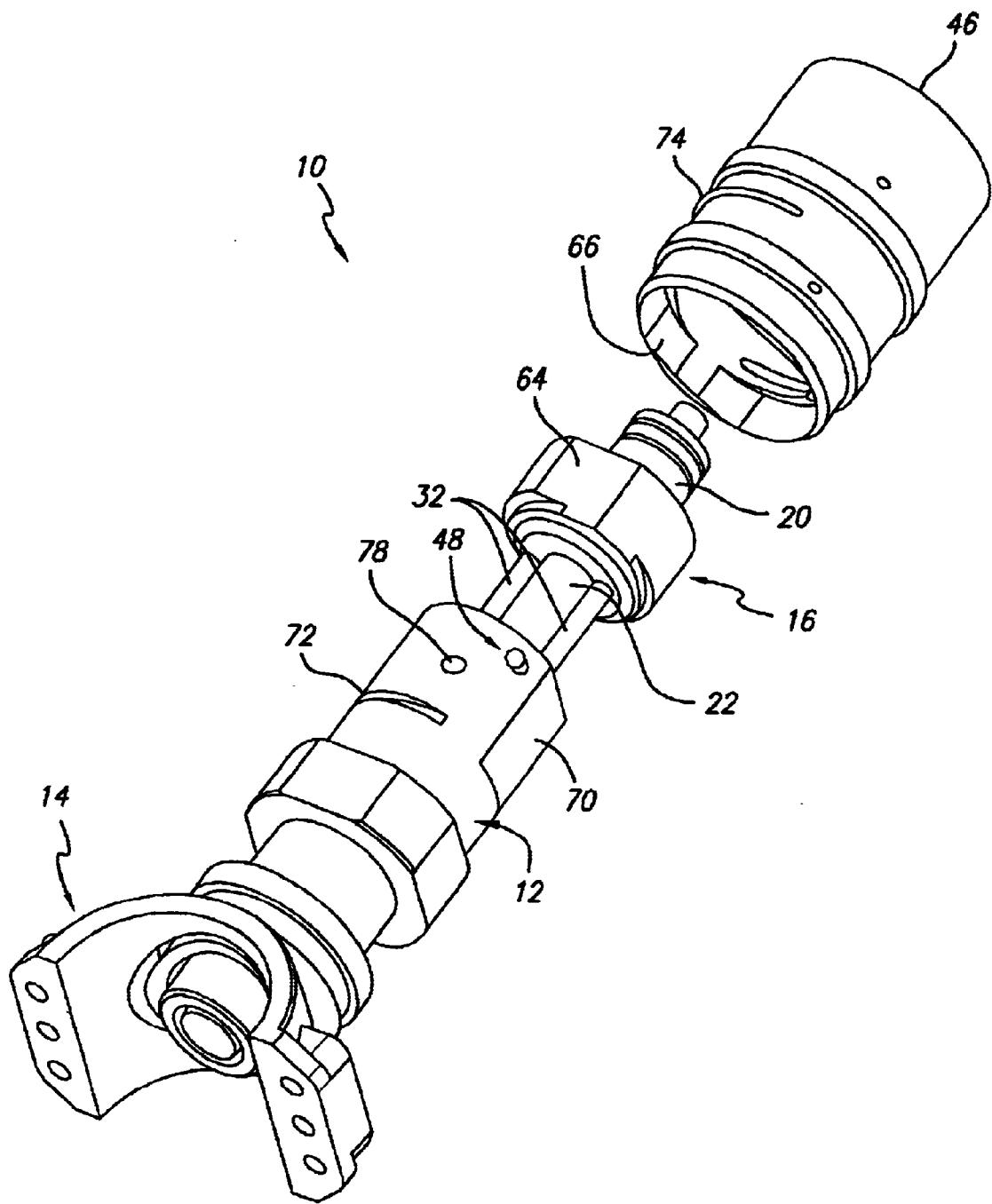
FIG. 1 is a perspective view of a preferred embodiment of a sensor assembly in accordance with the invention, the sensor assembly being shown with its movable sensor cartridge in a retracted position, and further being shown mounted to a saddle configured for attachment to a pipe carrying a fluid to be measured.
Figure 5A:
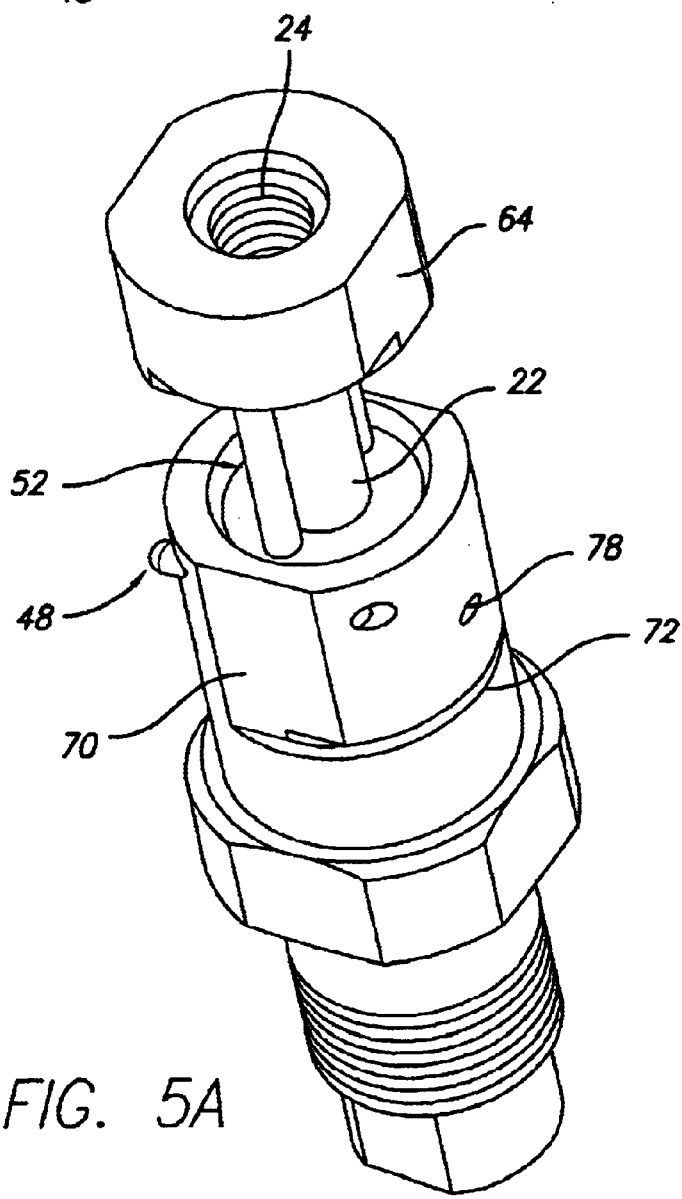
FIG. 5A is a perspective view of the housing and the sensor cartridge of the sensor assembly of FIG. 1.

With reference to the illustrative drawings, and particularly to FIG. 1, there is shown a wet-tap sensor assembly 10 in accordance with a preferred embodiment of the present invention, for measuring a parameter of a liquid or gas located within a pipe (not shown). The sensor assembly is of the type having a housing 12 configured to be sealably mounted over a hole in the pipe, eg., via a saddle 14, and fixer having a sensor cartridge 16 slidably received within a cylindrical cavity 18 (FIG. 2) of the housing. The sensor cartridge inserts and retracts a sensor probe 20 relative to the fluid within the pipe. The sensor probe is received within a barrel 22 of the sensor cartridge, and the barrel has an upper opening 24 (FIG. 5A) threaded for securing the sensor probe and a lower end 26 that defines slots 28 for exposing a sensing end 30 of the sensor probe to the flowing liquid. The sensor assembly is adaptable for use with various types of containers; however, for convenience of reference the invention will be described with reference to a pressurized pipe of flowing liquid (not shown).

Figure 2:
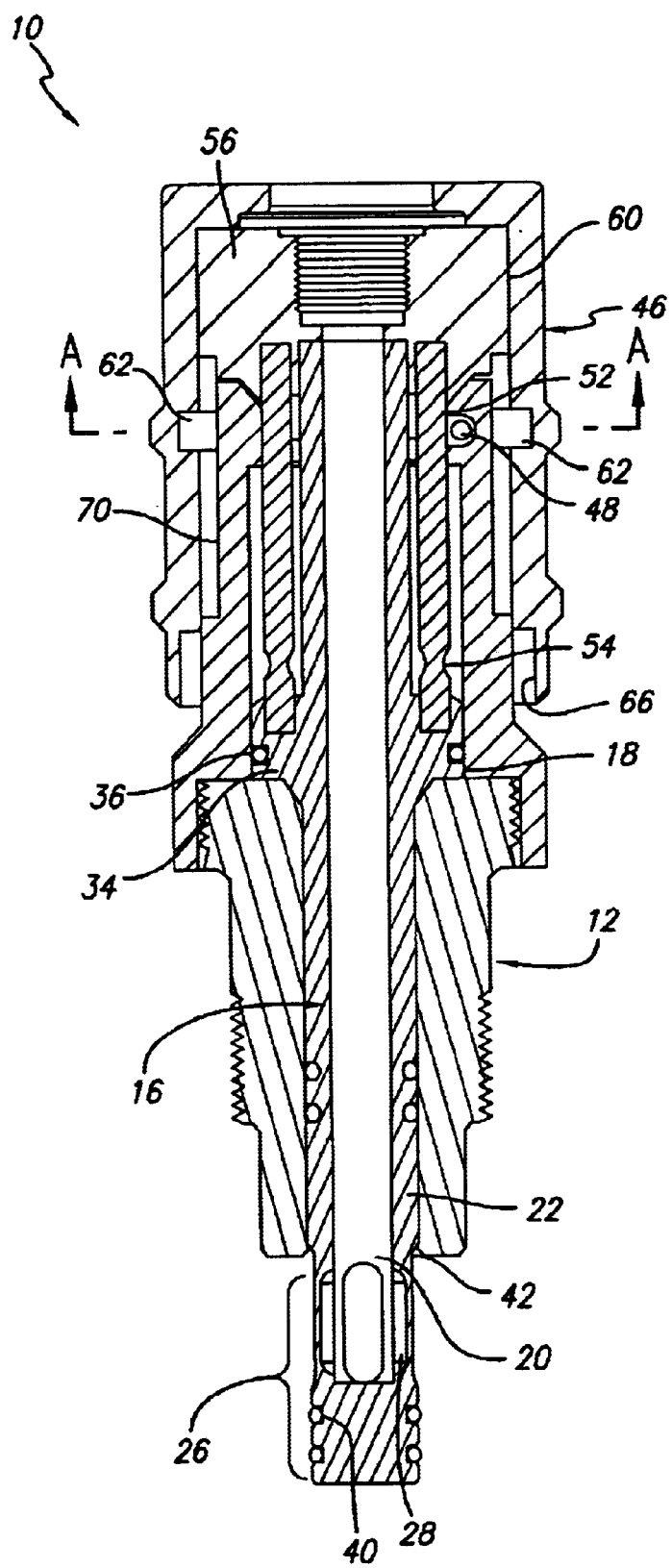
FIG. 2 is a side cross-sectional view of the sensor assembly of FIG. 1, showing the sensor cartridge in an inserted position.
Figure 3:
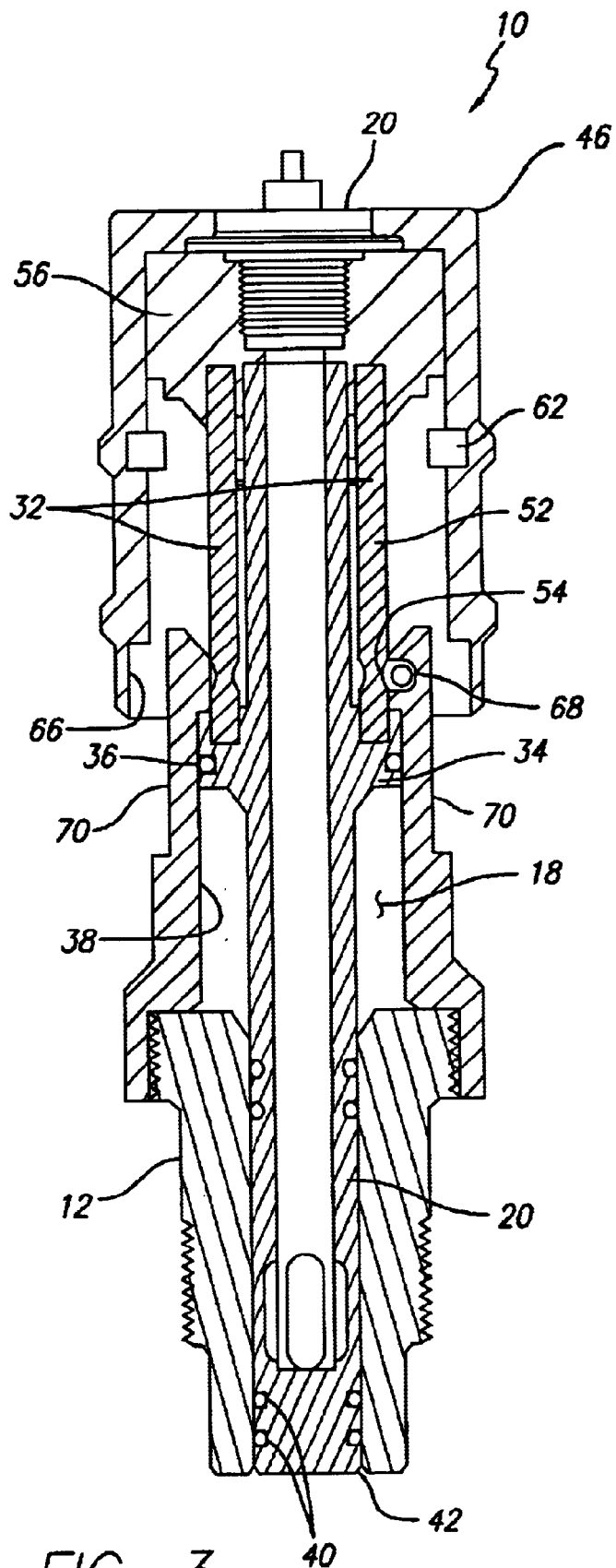
FIG. 3 is a side cross-sectional view of the sensor assembly of FIG. 1, showing the movable sensor cartridge in the retracted position, with a locking pin pressed back, and with orientation bars of a cap aligned with planar segments of a housing's outer surface.

With reference to FIGS. 1 and 2, the sensor cartridge 16 includes guide rods 32, which guide movement between a retracted position (FIG. 1) and an inserted position (FIG. 2). The guide rods are connected at their lower ends to a flange 34 encircling the barrel 22. The flange is positioned within the cylindrical cavity 18 (FIG. 3) and is encircled by a flange gasket 36 in contact with an inner wall 38 of the housing. In the inserted position, as depicted in FIG. 2, the sensing end 30 of the sensor probe 20 extends beyond a lower opening 42 of the housing 12 and is exposed to the flowing liquid. In the retracted position, as depicted in FIG. 3, the sensing end is retracted within the housing and gaskets 40 form a seal between the lower opening of the housing and the lower end 26 of the sensor cartridge to prevent the liquid from escaping. However, a risk of the liquid escaping would still exist. For example, if the cartridge is inadvertently inserted without the probe in place or if the probe is removed prior to retracting the cartridge, the liquid would escape through the barrel 22. In accordance with the present invention, the sensor assembly includes a locking mechanism 44 that automatically locks the sensor cartridge in place once retracted, and further includes a cap 46 configured to prohibit removal of the sensor probe while the sensor cartridge is in the inserted position. Moreover, the sensor assembly provides additional safety-related and economic benefits as will be described below.

Figure 4:
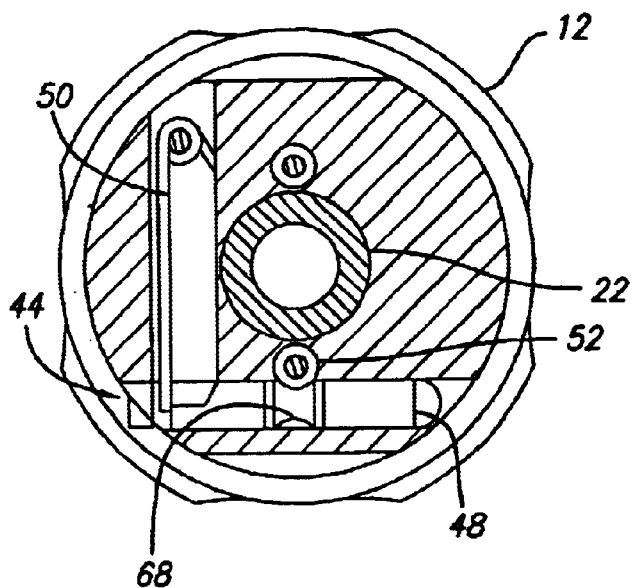
FIG. 4 is a cross-sectional view of the sensor assembly of FIG. 1, taken in the direction of the arrows A—A in FIG. 2, depicting a notch of the locking pin overlying an adjacent guide rod.
Figure 5B:
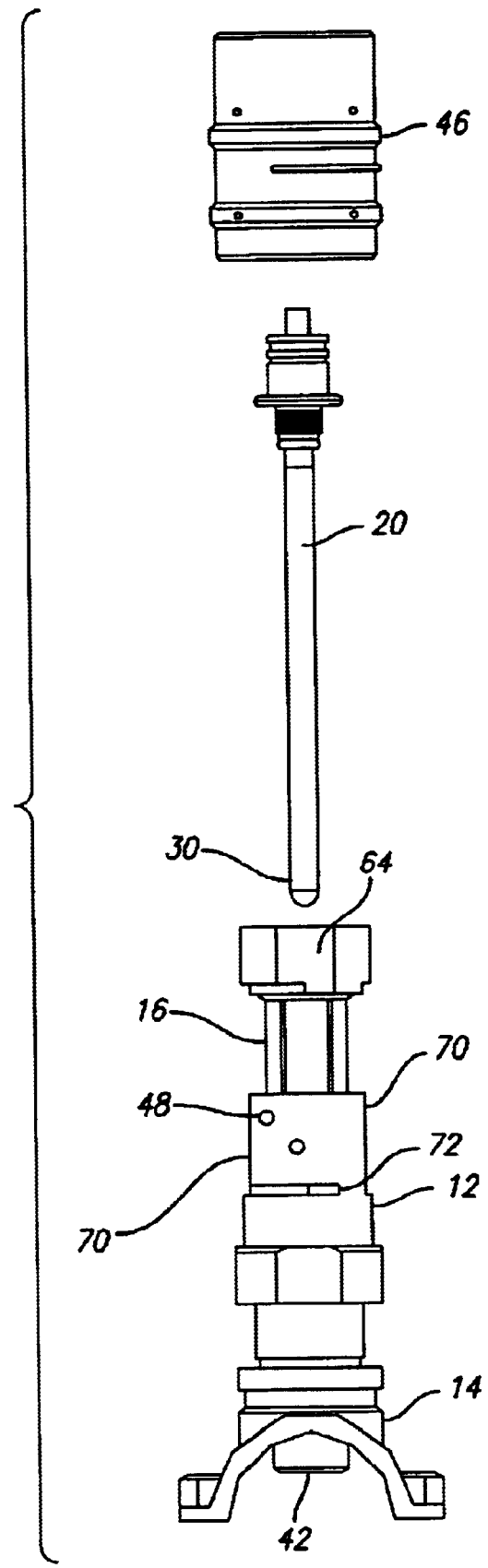
FIG. 5B is a side elevational view of the sensor assembly of FIG. 1, with the sensor cartridge being shown in the retracted position and with the sensor probe withdrawn.

With reference to FIG. 4, the locking mechanism 44 includes an engagement device, e.g., a locking pin 48, and a spring 50, both of which are mounted to the housing 12 adjacent to the guide rods 32. The spring is configured to urge the locking pin forward to engage an adjacent guide-rod 52 in an engagement region to prevent inadvertent insertion of the sensor cartridge 16. In this embodiment, the engagement region is defined as a guide-rod notch 54 at the adjacent guide-rod's lower end (FIG. 2), and once the sensor cartridge is retracted (FIG. 6A), the guide-rod notch overlies the locking pin, allowing the locking pin to project forward, which in turn locks the sensor cartridge in place. Thereafter, as depicted in FIG. 5B, the sensor probe 20 can be removed for maintenance or replacement, without risk of harm to personnel and without need to reduce or stop the flow of the liquid in the pipe. In this embodiment, both guide rods are provided with a notch; however, only one locking pin is used. In other embodiments, an additional locking pin can be used in conjunction with the second guide rod, or additional guide rods and locking pins can be used. In yet other embodiments, various other locking configurations known in the art can be used.

Figure 6A:
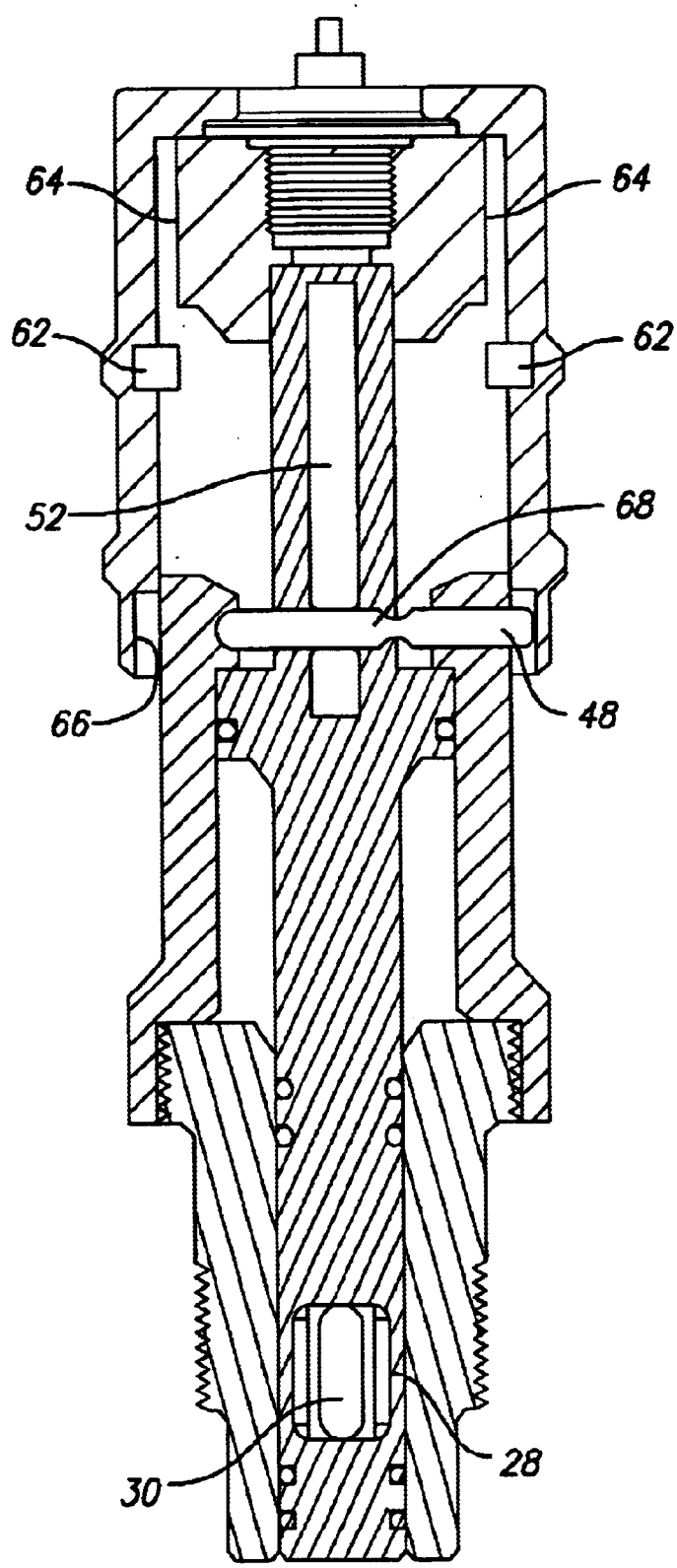
FIG. 6A is side cross-sectional view of the sensor assembly of FIG. 1, with the sensor cartridge being shown in the retracted position, with the sensor probe in place, and with the orientation bars aligned with planar segments of the cartridge head's outer surface.
Figure 6B:
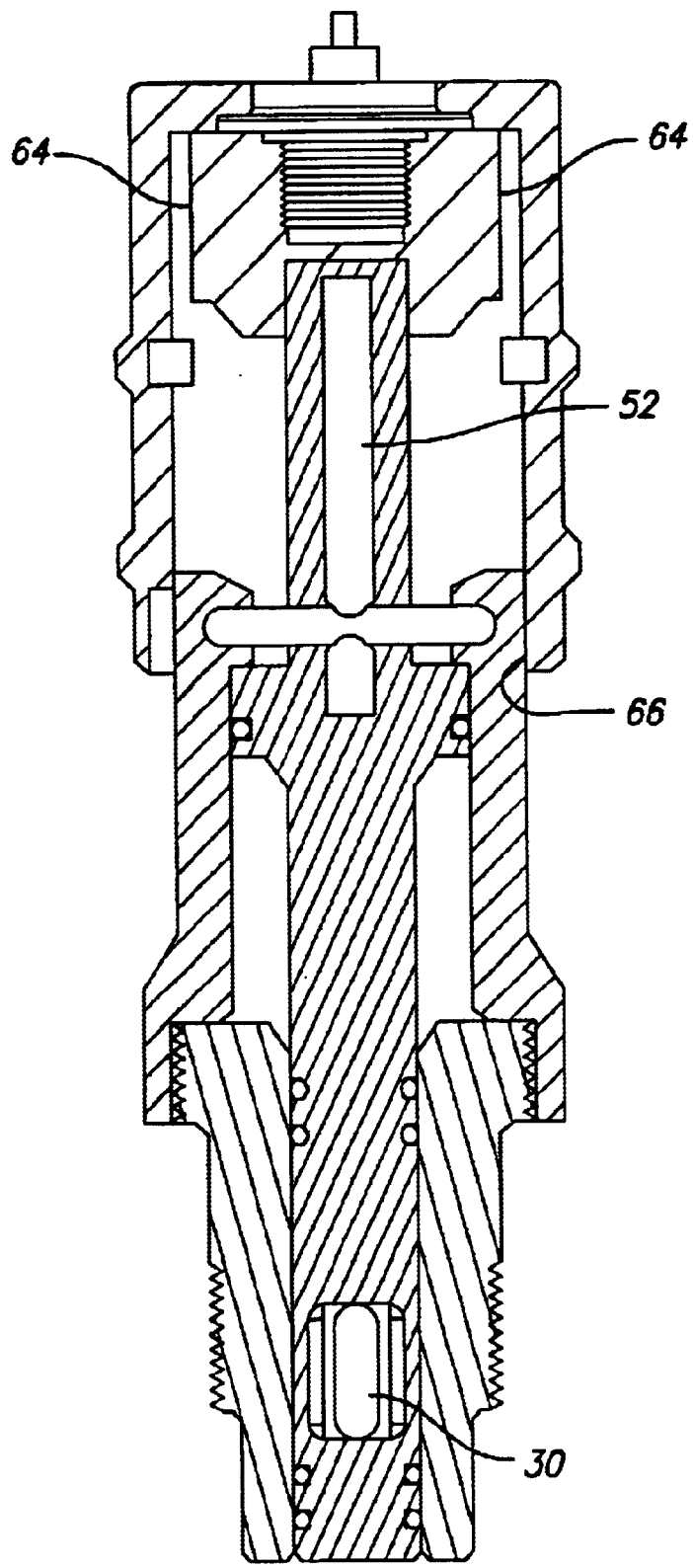
FIG. 6B is side cross-sectional view of the sensor assembly of FIG. 1, with the sensor cartridge being shown in the retracted position, with the orientation bars aligned with planar segments of the housing's outer surface, and with a cam surface of the cap pressing back the locking pin.
Figure 8:
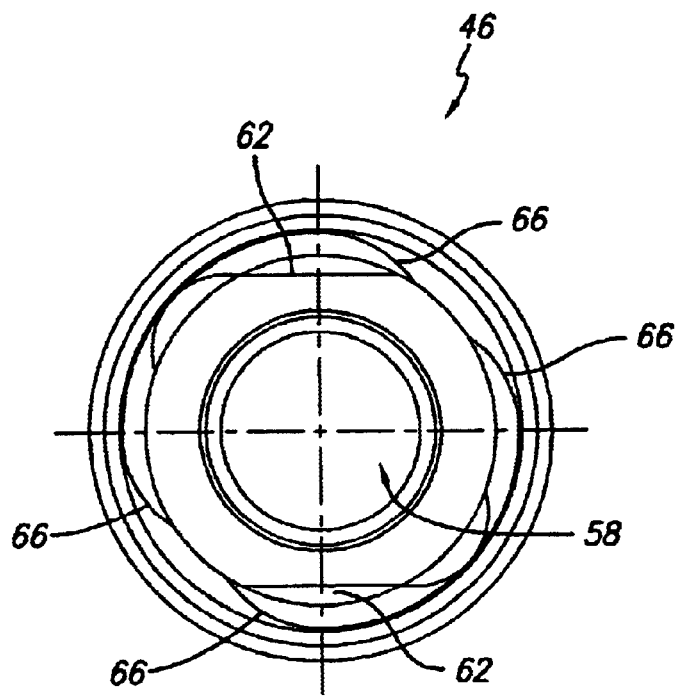
FIG. 8 is a bottom planar view of the cap of the sensor assembly of FIG. 1, depicting the inner cavity thereof.
Figure 7:
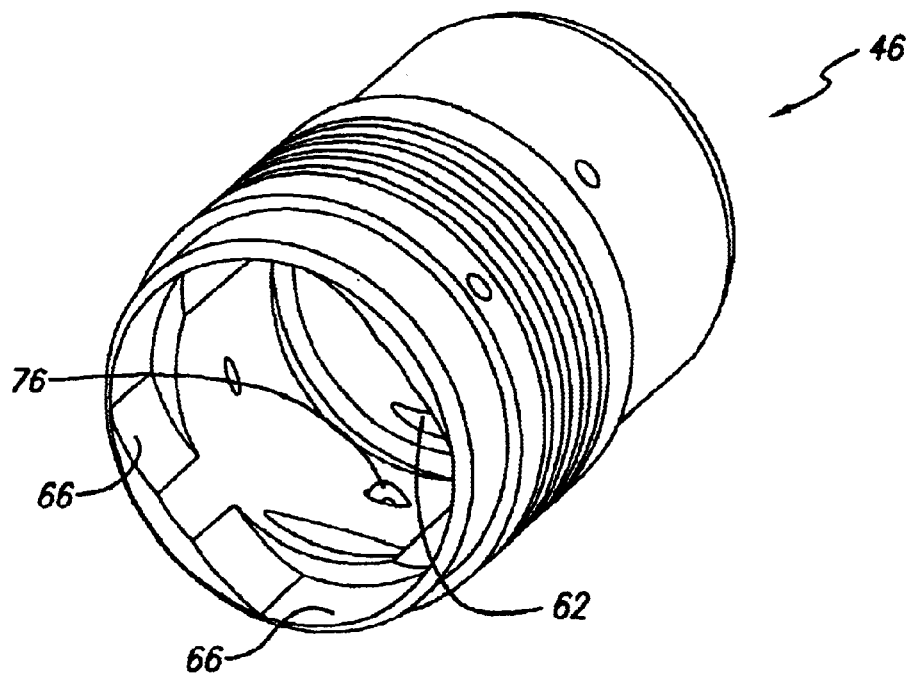
FIG. 7 is a perspective view of the cap of the sensor assembly of FIG. 1, depicting the inner cavity thereof.

After maintenance is complete, the sensor probe 20 or a replacement can be placed into the barrel 22, for insertion into the liquid once sensor cartridge 16 is unlocked. To unlock the sensor cartridge, the cap 46 is positioned on an upper portion of the sensor cartridge, i.e., a cartridge head 56. As depicted in FIG. 6A, the cap has an inner cavity 58 and the cartridge head has an outer surface that cooperatively require a prescribed orientation of the cap for proper placement on the cartridge head. More particularly, in this embodiment the cap includes orientation bars 62 positioned in the inner cavity that must be aligned with planar segments 64 of the cartridge head's outer surface for proper placement of the cap. The cap includes a cam surface 66 positioned below the orientation bars 62 and configured to rotationally engage and disengage the locking pin 48. Once the cap is properly placed, it is rotated a prescribed amount, causing the cam surface to press back the locking pin 48. Then, as depicted in FIG. 6B, a notch 68 defined in an intermediate region of the locking pin overlies the adjacent guide-rod 52 unlocking the sensor cartridge and allowing it to be slid to the inserted position.

Once the cap 46 is rotated to press back the locking pin 48, the orientation bars 62 become secured about the cartridge head 56, thereby prohibiting removal of the cap and the sensor probe 20 while the sensor cartridge is unlocked. In addition, the orientation bars become aligned with planar segments 70 located along the upper portion of the housing's outer surface. As depicted in FIG. 4, the sensor cartridge can now be transferred to the inserted position. Notably, the planar segments 64, 70 of the cartridge head and housing, respectively, are misaligned relative to one another. Due in part to this misalignment, neither the cap nor the sensor probe can be removed without first fully retracting the sensor cartridge, thereby preventing the liquid from escaping through the barrel 22.

With reference to FIG. 1, the housing 12 further defines two channels 72, each beginning at a respective lower edge of the planar segments 70 for receiving the orientation rods 62. Once the sensor cartridge is in the inserted position, the cap 46 can be rotated to a locked position, in which the orientation rods are secured in the channels. The cap includes a detent spring 74 having curved portions 76 projecting into the inner cavity 58. The housing defines recesses 78 (FIG. 5B) positioned to receive the curved portions of the spring, when the cap is in the locked position, thereby further securing the cap in place.

In another preferred embodiment, the sensor assembly 10 further includes an inhibiting device (not shown) for inhibiting placement of the cap 46 upon the sensor cartridge 18 without the sensor probe 20 in place. The inhibiting device is positioned adjacent to the opening 24 of the barrel 22 for inhibiting proper placement of the cap when the sensor probe removed. In a preferred embodiment, the inhibiting device is configured as a slidable sleeve defining the opening of the barrel. In another preferred embodiment, the inhibiting device is configured as a locking spring mechanism that is compressed by threading the sensor probe in place. In yet other preferred embodiments, the inhibiting device may be positioned in the cylindrical cavity 18 of the cap. The cap cannot unlock the cartridge from the retracted position without the sensor probe in place to prevent the liquid from traveling up the bore 36.

It should be appreciated from the foregoing description that the present invention provides a wet-tap sensor assembly for use in measuring a parameter of fluid located within a container that reduces the risk of escape, thereby providing increased safety and related benefits. The sensor assembly includes a locking mechanism that locks the sensor cartridge in the retracted position allowing for removal of the sensor probe while preventing against inadvertent displacement of the sensor cartridge, and preferably includes a cap positioned over the sensor cartridge that prohibited removal of the sensor probe without first retracting the sensor cartridge and that disengages the locking mechanism.

The foregoing detailed description of the present invention is provided for the purposes of illustration and is not intended to be exhaustive or to limit the invention to the precise embodiments disclosed. Accordingly, the scope of the present invention is defined by the following claims.

We claim:

1. A sensor assembly, configured to be mounted to an external wall of a container for supporting a sensor to measure a predetermined parameter of a fluid located therein, the sensor assembly comprising:
   a housing configured to be securely positioned relative to the external wall of the container, the housing having a lower portion and an upper portion, and the housing defining a cavity with a first opening at the lower portion and a second opening at the upper portion;
   a sensor cartridge mounted for movement in the cavity, between an inserted position and a retracted position, the cartridge defining an elongated opening with an upper end for receiving the sensor probe and a lower end for exposing a sensing end of a sensor probe when in the inserted position;
   a gasket configured to contact both the lower portion of the sensor cartridge below the lower end of the elongated opening and a surface of the housing defining the cavity when the cartridge is in the retracted position, thereby providing a liquid-proof, pressure-resistant seal between the sensor cartridge and the housing at their respective lower portions; and
   a locking mechanism configured to secure the sensor cartridge in the retracted position, the locking mechanism including
      a locking pin mounted for movement in a recess of the housing adjacent to the sensor cartridge and configured to interface with the sensor cartridge to secure the sensor cartridge when in the retracted position, and
      a resilient member attached to the locking pin configured to urge the locking pin to engage the sensor cartridge.

2. A sensor assembly as defined in claim 1, wherein the sensor assembly further includes a guide rod attached at a first end to the upper portion of the sensor assembly and projected downward therefrom, the guide rod defines a notch configured to overlie the locking pin when the sensor cartridge is in the retracted position, allowing the locking pin to project forward, securing the sensor cartridge in the retracted position.

3. A sensor assembly as defined in claim 2, further comprising a cap configured to be placed over the upper portion of the sensor cartridge and to engage and disengage the locking mechanism.

4. A sensor assembly configured to be mounted to an external wall of a container for supporting a sensor to measure a predetermined parameter of a fluid located therein, the sensor assembly comprising:
   a housing configured to be securely positioned relative to the external wall of the container, the housing having a lower portion and an upper portion, and the housing defining a cavity with a first opening at the lower portion and a second opening at the upper portion;
   a sensor cartridge mounted for movement in the cavity, between an inserted position and a retracted position, the cartridge defining an elongated opening with an upper end for receiving the sensor probe and a lower end for exposing a sensing end of a sensor probe when in the inserted position;
   a gasket configured to contact both the lower portion of the sensor cartridge below the lower end of the elongated opening and a surface of the housing defining the cavity when the cartridge is in the retracted position, thereby providing a liquid-proof, pressure-resistant seat between the sensor cartridge and the housing at their respective lower portions;
   a locking mechanism configured to secure the sensor cartridge in the retracted position and having an a locking pin mounted to the housing; and
   a cap, having a longitudinal axis, configured to be placed over the upper portion of the sensor cartridge and to engage and disengage the locking mechanism.

5. A sensor assembly as defined in claim 4, wherein the cap has a first radial orientation and a second radial orientation about its longitudinal axis when positioned on the sensor cartridge in the retracted position, the first orientation allowing the locking mechanism to engage and the second orientation disengaging locking mechanism.

6. A sensor assembly as defined in claim 5, wherein:
   the cap defines an inner cavity configured to limit placement of the cap upon the sensor cartridge to selected orientations about its longitudinal axis; and
   the upper portion of the sensor cartridge is configured to receive the cap in only the selected orientations.

7. A sensor assembly as defined in claim 6, wherein:
   the cap has an alignment bar positioned in the inner cavity, and
   the upper portion of the sensor cartridge has a planar surface on a longitudinal side thereof configured to allow placement of the cap upon the sensor cartridge.

8. A method of operating a sensor assembly comprising:
   inserting a sensor probe having a sensing end into a sensor assemble mounted to an external wall of a container or pipe, the sensor assembly including
      a housing configured to be securely positioned relative to the external wall of the container, the housing having lower portion and an upper portion, and the housing defining a cavity with a first opening at the lower portion and a second opening at the upper portion, a sensor cartridge mounted for movement in the cavity, between an inserted position and a retracted position, the cartridge defining an elongated opening with an upper end for receiving the sensor probe and a lower end for exposing a sensing end of a sensor probe when in the inserted position, a gasket configured to contact both the lower portion of the sensor cartridge below the lower end of the elongated sensor opening and a surface of the housing defining the cavity when the cartridge is in the retracted position, thereby providing a liquid-proof, pressure-resistant seal between the sensor cartridge and the housing at their respective lower portions, and a locking mechanism configured to secure the sensor cartridge in the retracted position;

unlocking the locking mechanism of the sensor assembly by placing a cap, having a longitudinal axis, over the upper portion of the sensor cartridge, and disengaging the locking mechanism by rotating the cap about its longitudinal axis; and transferring the sensor cartridge from the retracted position to the inserted position thereby exposing the sensing end beyond the first opening of the housing.

9. A method as defined in claim 8, wherein:

the cap defines an inner cavity configured to limit placement of the cap upon the sensor cartridge to selected orientations about its longitudinal axis, and the upper portion of the sensor cartridge is configured to receive the cap in only the selected orientations.

10. A method as defined in claim 8, further comprising the step of securing the cap to the housing once the sensor cartridge is in the inserted position by rotating the cap about its longitudinal axis.

* * * * *

UNITED STATES PATENT AND TRADEMARK OFFICE
CERTIFICATE OF CORRECTION

PATENT NO. : 6,640,658 B1
DATED : November 4, 2003
INVENTOR(S) : Sergio Guerrero et al.

It is certified that error appears in the above-identified patent and that said Letters Patent is hereby corrected as shown below:

Column 3,
Line 26, change "fixer" to -- further --

Column 6,
Line 30, change "seat" to -- seal --
Line 60, change "assemble" to -- assembly --

Signed and Sealed this

Thirteenth Day of April, 2004

JON W. DUDAS
*Acting Director of the United States Patent and Trademark Office*